(12) United States Patent
Iversen et al.

(10) Patent No.: US 11,347,466 B2
(45) Date of Patent: May 31, 2022

(54) WIRELESS CONTENT DELIVERY FOR A TILED LED DISPLAY

(71) Applicant: IMAX Theatres International Limited, Dublin (IE)

(72) Inventors: Steen Svendstorp Iversen, Kongens Lyngby (DK); Anton Leonard Baljet, Oakville (CA); Denis Gilles Tremblay, Brampton (CA)

(73) Assignee: IMAX Theatres International Limited, Dublin (IE)

( * ) Notice: Subject to any disclaimer, the term of this patent is extended or adjusted under 35 U.S.C. 154(b) by 0 days.

(21) Appl. No.: 16/636,228

(22) PCT Filed: Aug. 9, 2018

(86) PCT No.: PCT/IB2018/056021
§ 371 (c)(1),
(2) Date: Feb. 3, 2020

(87) PCT Pub. No.: WO2019/034975
PCT Pub. Date: Feb. 21, 2019

(65) Prior Publication Data
US 2020/0371736 A1    Nov. 26, 2020

Related U.S. Application Data

(60) Provisional application No. 62/545,080, filed on Aug. 14, 2017.

(51) Int. Cl.
*G06F 3/14* (2006.01)
*G09G 3/32* (2016.01)
*H04B 10/114* (2013.01)

(52) U.S. Cl.
CPC ............. *G06F 3/1446* (2013.01); *G09G 3/32* (2013.01); *H04B 10/1141* (2013.01);
(Continued)

(58) Field of Classification Search
CPC ...... H04N 9/3102; H04N 9/3138; H04N 9/12; G06F 3/1446; G09G 3/32;
(Continued)

(56) References Cited

U.S. PATENT DOCUMENTS 6,863,400 B1 * 3/2005 Liang ................. G02B 27/1066
348/E5.053
7,129,910 B2 * 10/2006 Da Cunha ............ G09G 3/2088
345/1.3
(Continued)

FOREIGN PATENT DOCUMENTS

CN    102474630    5/2012
CN    105589669    5/2016
(Continued)

OTHER PUBLICATIONS

PCT/IB2018/056021 , "International Search Report and Written Opinion", dated Jan. 22, 2019, 23 pages.
(Continued)

*Primary Examiner* — Christopher E Leiby
(74) *Attorney, Agent, or Firm* — Kilpatrick Townsend & Stockton LLP

(57) ABSTRACT

An active display (102) can be used in a theatre environment (100) in which content to be displayed by the active display (102) can be delivered wirelessly using emitters (118). The active display (102) can include tiles (104a-104d) with detectors (106a-106d) that can detect the wireless signals. The active display (102) can include circuitry that can interpret instructions from the wireless signals for controlling the output (108a-108d) of pixels on the tiles.

23 Claims, 12 Drawing Sheets

(52) U.S. Cl.
CPC . *G09G 2320/0693* (2013.01); *G09G 2356/00* (2013.01); *G09G 2370/022* (2013.01); *G09G 2370/16* (2013.01); *G09G 2370/18* (2013.01)

(58) Field of Classification Search
CPC ....... G09G 2320/0693; G09G 2370/18; G09G 2370/022; G09G 2370/16; G09G 2356/00; H04B 10/1141
See application file for complete search history.

(56) References Cited

U.S. PATENT DOCUMENTS

| | | | | | |
|---|---|---|---|---|---|
| 8,593,255 | B2* | 11/2013 | Pang | ................. | G06K 7/10019 |
| | | | | | 725/51 |
| 9,336,748 | B1* | 5/2016 | Katsis | ................. | H04N 9/3129 |
| 9,819,907 | B2* | 11/2017 | McNelley | ............ | H04N 9/3147 |
| 2003/0193485 | A1* | 10/2003 | da Cunha | ............. | G09G 3/002 |
| | | | | | 345/204 |
| 2004/0090396 | A1* | 5/2004 | Allen | ....................... | H04N 9/30 |
| | | | | | 345/48 |
| 2005/0062682 | A1* | 3/2005 | May | ....................... | G09G 3/002 |
| | | | | | 345/30 |
| 2005/0168399 | A1* | 8/2005 | Palmquist | ............. | G06F 1/1601 |
| | | | | | 345/1.1 |
| 2006/0114172 | A1* | 6/2006 | Shivji | ................... | G09F 9/3026 |
| | | | | | 345/1.1 |
| 2008/0048880 | A1* | 2/2008 | Strickland | ............. | G06F 3/0488 |
| | | | | | 340/815.4 |
| 2008/0305713 | A1* | 12/2008 | Cortenraad | ............. | A63F 13/00 |
| | | | | | 446/485 |
| 2010/0123732 | A1* | 5/2010 | Jenks | ....................... | H04N 9/12 |
| | | | | | 345/592 |
| 2011/0069094 | A1* | 3/2011 | Knapp | ................. | G09G 3/3426 |
| | | | | | 345/82 |
| 2011/0284625 | A1* | 11/2011 | Smith | ................... | G06K 7/1098 |
| | | | | | 235/375 |
| 2013/0181884 | A1* | 7/2013 | Perkins | ................. | G09F 9/3026 |
| | | | | | 345/1.3 |
| 2014/0307230 | A1* | 10/2014 | Hajjar | ................... | H04N 9/3138 |
| | | | | | 353/30 |
| 2015/0262240 | A1 | 9/2015 | Richardson | | |
| 2016/0133226 | A1* | 5/2016 | Park | ........................... | G06F 3/01 |
| | | | | | 345/1.3 |
| 2016/0277120 | A1* | 9/2016 | Halbritter | ............. | H04B 10/671 |
| 2017/0140701 | A1* | 5/2017 | Ogonowsky | ............. | H01L 33/62 |
| 2017/0141851 | A1* | 5/2017 | Cook | ................... | H04B 10/502 |
| 2017/0223312 | A1* | 8/2017 | McNelley | ............ | H04N 9/3147 |
| 2018/0090054 | A1* | 3/2018 | Zhang | ................... | G09G 3/2096 |
| 2018/0203660 | A1* | 7/2018 | Hwang | ................... | G06F 3/1423 |
| 2018/0260185 | A1* | 9/2018 | Garrity | ................... | G06F 40/106 |
| 2018/0277032 | A1* | 9/2018 | Ng | ......................... | G06F 3/1446 |
| 2018/0293041 | A1* | 10/2018 | Harviainen | .......... | H04N 13/332 |

FOREIGN PATENT DOCUMENTS

| | | |
|---|---|---|
| CN | 105867861 | 8/2016 |
| KR | 20160078750 | 7/2016 |

OTHER PUBLICATIONS

PCT/IB2018/056021, "Invitation to Pay Add'l Fees and Partial Search Report", dated Nov. 30, 2018, 17 pages.
CN Application No. CN201880052695.4, Office Action, dated Apr. 21, 2021, 12 pages.
CN Application No. CN201880052695.4, Office Action, (English machine translation and Summary provided), dated Dec. 14, 2021, 6 pages.

* cited by examiner

WIRELESS CONTENT DELIVERY FOR A TILED LED DISPLAY

CROSS REFERENCE TO RELATED APPLICATIONS

This disclosure claims the benefit of priority of U.S. Patent Application No. 62/545,080, titled "LED Display with Distributed Optical Communication" and filed Aug. 14, 2017, the entire contents of which are incorporated herein by reference.

TECHNICAL FIELD

This disclosure relates generally to active displays for motion-picture theatre environments. More particularly, but not necessarily exclusively, this disclosure relates to delivering content wirelessly to an active display for output toward an audience-viewing position.

BACKGROUND

Large LED displays in billboards, stadiums, etc. can be designed such that when a circuit board fails, it is acceptable for that defect until a service call can be scheduled. In a cinema application, a large LED display can form all or part of the cinematic display and each circuit board may be "mission critical." While a few single failing LEDs (e.g., dead pixels) may be acceptable until service can be performed, a single failing circuit board may cause canceled shows, lost revenues, refunded tickets and frustrated customers.

Cables, connectors, and high frequency demultiplexing and image processing computer hardware are causes of failing circuits in large LED displays. And some of the circuitry can be a source of electromagnetic interference. To reduce cabling, circuit boards can be preassembled into panels that are supplied via a daisy-chained image signal loop through the panels. While this arrangement can reduce the number of external cables, the cables and connectors that remain can still fail. And it can be difficult to access panels that include demultiplexing processors that may be "mission critical" components in a cinema context. These components may also consume significant power and cause electromagnetic interference. And installation and service/replacement of LED circuit boards/panels is time consuming and expensive because it requires cables connections and circuit board configuration of thousands of circuit boards on-site.

Wireless RF data transmission can replace cables, but such systems require expensive components and regulatory approvals. Some wireless transmission systems require data compression that is undesirable in a high-performance environment, such as cinema display.

Moreover, cinemas require higher data protection than typical LED display applications. Large LED displays are generally not designed for sensitive image data to be protected against piracy. Cinema applications involve signals provided to the displaying unit that either are physically protected to a certain level or are encrypted. Including link decryption blocks in each panel and physically securing the panels can be used, but doing so introduces yet more "mission critical," difficult-to-access, single point of failures, as well as cost, power consumption, and electromagnetic interference (EMI) sources.

SUMMARY

In one example, a wireless content delivery system comprises a plurality of wireless emitters communicatively coupled to a source of content. Each wireless emitter of the plurality of wireless emitters is configured for wirelessly transmitting content for display by a tile of an LED display that is physically separated from the plurality of wireless emitters and that includes wireless signal detectors for receiving the content for display.

In another example, a wireless content delivery system comprises a tile for an LED display. The tile comprises a plurality of LEDs and a wireless signal detector on the tile or communicatively coupled thereto. The wireless signal detector is configured to detect a wireless signal transmitted by an emitter that is physically separate from the LED display. The wireless signal carries content for display by the tile for the LED display.

In another example, a method includes separately and wirelessly transmitting, by a plurality of wireless transmitters, signals toward an LED display with tiles having wireless signal detectors. The signals include data for display on the LED display. Each wireless transmitter of the plurality of wireless transmitters directs the signals toward a designated wireless signal detector on the LED display. The method also includes detecting the wireless signals and converting the wireless signals to electronic signals for controlling light output by the LED display.

In another example, a wireless content delivery system includes a light source and a spatial light modulator communicatively coupled to a source of content. The spatial light modulator is configured for modulating light from the light source based on the content for wirelessly transmitting content for display by a tile of an LED display that is physically separated from the spatial light modulator and that includes wireless signal detectors for receiving the content for display.

In another example, a display system includes a first tile and a second tile. The first tile is for displaying a first image. The second tile is for displaying a second image. The first tile is connected to the second tile to communicate data with the second tile. The first tile is configured to display first image data received by the first tile that is intended for the first tile to display and pass second image data intended for a second tile to display to the second tile. The second image data is different than the first image data.

DETAILED DESCRIPTION

Figure 1:
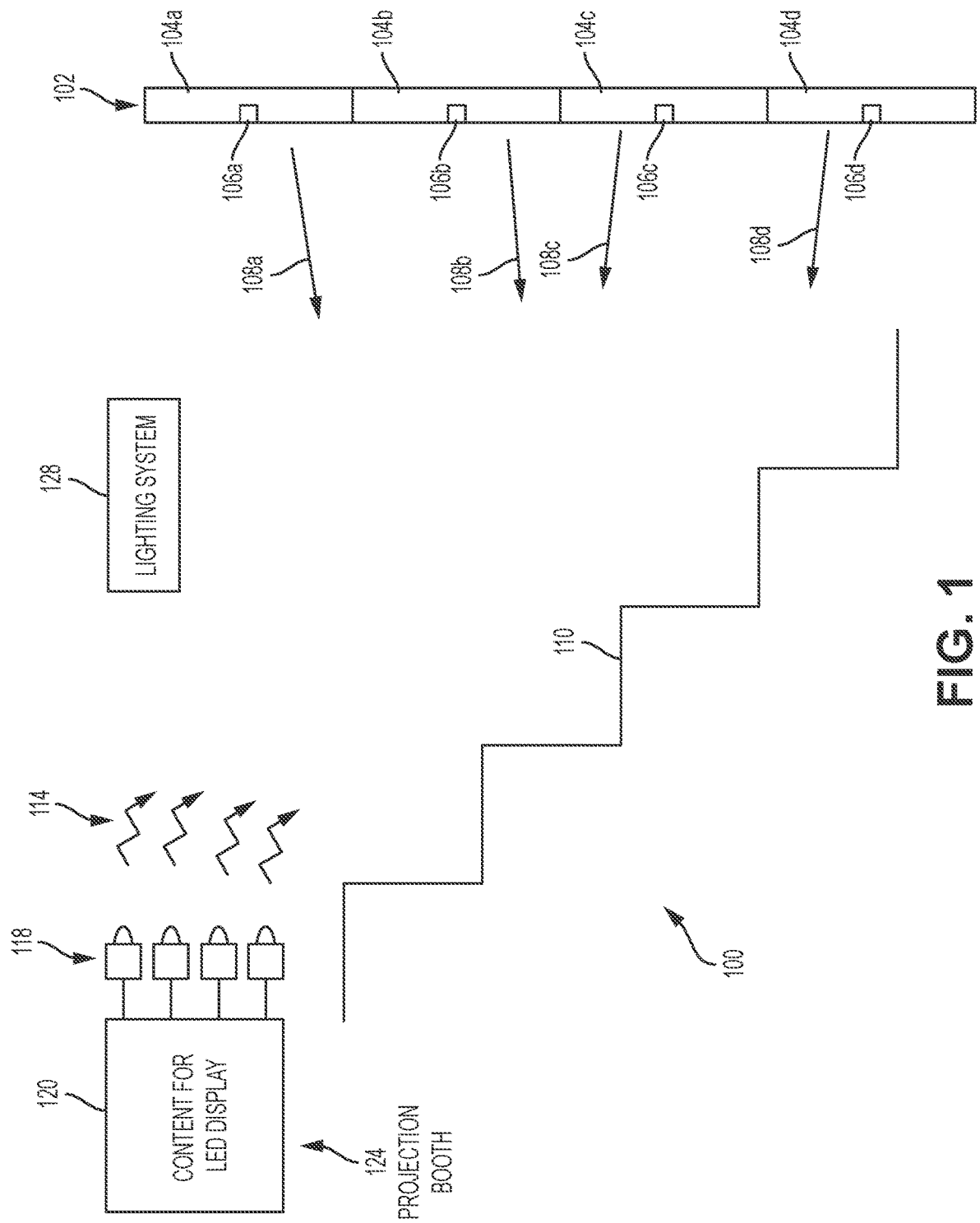
FIG. 1 is a schematic view of a theatre environment with a system for wirelessly delivering content to an LED display for display toward a patron-seating area according to one example of the present disclosure.

Certain aspects and features relate to wirelessly delivering content for display by an LED display. The content can be wirelessly delivered, and wirelessly received, by a wireless content delivery system that includes wireless emitters and wireless signal detectors (which may also be referred to herein as sensors). The emitters can be communicatively coupled to a source of content, such as a server or other electronic data storage device. Each emitter can wirelessly transmit content for display by a tile of the LED display. The tiles are physically separated from the wireless emitters and the tiles form the LED display. That is, the LED display is formed using multiple tiles, each with LEDs that are controllable for delivering visual content. The tiles include wireless signal detectors for receiving the content for display by the LED display. The detected signals can be used to control the LEDs for the particular tile, such as by controlling the color and brightness outputted by each LED for the tile.

The emitters can be positioned in a theatre that includes the LED display. In some examples, a patron-seating area is located between the emitters and the LED display. In other examples, the LED display is positioned between the patron-seating area and the emitters. In some examples, the emitters are infrared (IR) emitters that emit signals in the IR spectrum. In other examples, the emitters can emit other types of signals, such as radio frequency signals.

In another example, the system can include an emitter that can wirelessly transmit a signal with information intended for multiple detectors. Information intended for a first detector can be coded so that it is detectable just by the first detector and information in the same signal intended for a second detector can be coded so that it is detectable by just the second detector. The detectors may be low bandwidth. For example, each detector may have a bandwidth in a range of 1 MHZ to 50 MHZ.

By wirelessly delivering content to an LED display, wires, connectors, and other components that often fail may be unnecessary for the LED display to receive and display content in a theatre setting.

In some examples, wireless data links to each circuit board per panel or tile can include narrow angle, near-infrared (NIR) beams from a transmission unit targeted at IR receivers on each circuit board, transmitting only the section of the image to be displayed by that circuit board. This can reduce the bandwidth used on each data link.

Further, the need for demultiplexing hardware on the circuit boards can be eliminated. Image processing can be performed at the transmission unit, which can quickly be replaced with a spare unit in case of failure, and which can better be contained for EMC considerations, etc. This may increase reliability and at the same time reduce complexity and cost of the display itself greatly, as it eliminates demultiplexing and video processing hardware on the panels, and involves a handful of inexpensive low frequency components, such as address decoders, shift registers, LED drivers, etc., on the panel. These components can be mounted on a printed circuit board (PCB) directly, likely reducing component cost by an order of magnitude.

Certain examples can also eliminate time, expenses, and potential errors to cable installation and configuration of thousands of circuit boards or hundreds of panels on-site. A circuit can be replaced and connected to power cables, or a power bus or rails, to begin receiving the correct signal from the infrared narrow beam from the emitter, without cable connections or requiring a panel-ID to be entered, or similar time-consuming and error-prone operations. In some examples, the infrared emitter assembly can be pre-manufactured as an integrated unit instead of being installed as a number of discrete components.

Narrow-angle beams can increase the signal-to-noise ratio at the receiver to enable on/off signaling, which can have order of magnitudes higher bandwidth and even lower costs than commercially available near infrared (NIR) carrier wave modulation components. Narrow-angle beams can provide an inherent physical protection that may eliminate the need for encrypted data and the risk of mission critical failures and EMI issues in decryption blocks at the display. The transmission unit can be physically secured and beams can be emitted from a secured area, such as a projection booth behind a projection port window. Front access to the transmission unit can be made to be difficult to prevent an intruder from intercepting all beams to intercept the data. Additionally, NIR receivers may be designed to reflect infrared signals toward the ceiling of a theatre environment to prevent recording reflections.

Although various aspects are described herein with respect to a display that is an LED display, other types of displays can be used with examples of systems described herein. Examples of the other types of displays include OLED displays, LCD displays, and other types of active displays.

In some examples, the wireless content delivery system can include a spatial light modulator and an imaging system that can project an infrared image from the spatial light modulator to at least one IR detector to provide data to a section of the LED display. Rather than switching at a sufficiently high frequency to communicate data wirelessly, IR signals can be modulated optically by the spatial light modulator to communicate data to the LED display. Alignment of projected infrared image pixels to illuminate the corresponding infrared sensors may be achieved by using image-warping techniques to modify a transmission image transmitted to the spatial light modulator such that the projected NIR image pattern matches the pattern of the positions of the infrared sensors at the display. An example of the spatial light modulator that can be used to modulate NIR light is a Digital Micromirror Device.

In one example, the wireless content delivery system receives high-bandwidth image data (e.g., data intended for high-definition display) from a server or other device and delivers the data wirelessly through a matrix of low bandwidth wireless channels to an LED display that is segmented into multiple tiles (i.e., panels) such that each tile can in effect be a low-bandwidth display, but the LED display in total is a high-definition display.

FIG. 1 is a schematic view of a theatre environment 100 with a system for wirelessly delivering content to an LED display 102 for display toward a patron-seating area 110 according to one example. The LED display is formed by multiple tiles (i.e., panels) 104a-d. The tiles 104a-d include LEDs that can output light (represented by arrows 108a-d) toward the patron-seating area 110 that is positioned between the LED display 102 and a projection booth 124. The projection booth 124 includes a protected server 120 or other source for content to be displayed on the LED display 102. For example, the projection booth 124 may be locked or otherwise secure from unauthorized access to the source of content. The projection booth 124 also includes infrared (IR) emitters 118 that emit IR beams 114 that include content for display on the LED display 102.

The IR signals can be received by IR detectors 106a-d (or other types of wireless signal detectors) on the tiles 104a-d of the LED display 102. For example, each tile can include an IR detector that can detect IR signals directed toward the IR detector. Each IR emitter may output a narrow-beam, or narrow-angle, IR signal directed toward one of the IR detectors 106a-d on the LED display 102 such that the IR detector receives an IR signal from that IR emitter, but not the other IR emitters. The IR signal received by the IR detector can include data used to control LEDs on the associated tile. For example, the data can specify the color, brightness, and timing information to display image data on the LEDs of the associated tile of the LED display 102. In other examples, the data includes a portion of an image to be depicted by the LEDs on the tile. The IR detectors 106a-d can convert the IR signal to an electronic signal and the tiles 104a-d can include circuitry that can control the LEDs based on the data in the electronic signal.

A sync signal can be used to command the tiles 104a-d to switch to display from the previously received image frame to the last received image. The sync signal may be embedded in the IR beams, for example by defining a sync frame. Alternatively, the sync can be separately broadcast.

The theatre may have lights, represented by a lighting system 128 in FIG. 1. The theatre lighting system 128 can be designed to avoid illuminating the IR detectors 106a-d in the LED display 102 with an intensity (or signal strength) above a threshold in a range of infrared wavelengths. The narrow-angle beams from the IR emitters 118 can illuminate the IR detectors 106a-d on the LED display 102 with an intensity (or signal strength) at or above the threshold. And the IR detectors 106a-d may filter IR signals having an intensity (or signal) below the threshold.

In some examples, the IR emitters 118 can transmit image data as binary serial data signal by modulating the intensity of at least one of the narrow-angle IR signals between two states. In one state, at least one IR detector is illuminated with an intensity above the threshold and in the other state, the IR detector is illuminated with an intensity below the threshold, similar to an optocoupler. This may accommodate higher bandwidth as compared to carrier-wave modulation, and the transmission and panel circuitry can be simpler and cheaper. A thresholding amplifier with hysteresis feeding a shift register can be included in the tile to facilitate detecting IR signals with an intensity above the threshold. The tile can also include clocking circuitry to facilitate synchronizing received image data and displaying the image data. The image data can be partitioned into more than one serial data stream to create in-series and parallel data streams to accommodate a higher bandwidth. An LED display circuit board can be included that is compatible to receive data of a serial/parallel format. Image data emitted to multiple tiles that is already synchronized when transmitted can be self-clocked and received as asynchronous data. In other examples, a house or common clock signal for data synchronization and image synchronization can be distributed to display segments using a wide-angle IR emitter having a different range of wavelengths than the narrow-angle beams. The LED display 102 can include sensors for receiving the house clock signal. For example, the sensors may be sensitive to the wavelengths in the wide-angle IR emitter and not to wavelengths in the narrow angle beams from IR emitters. In other examples, the house clock signal is distributed to tiles using an electrical conducting bus connected to the tiles 104a-d, or the house clock signal is modulated into a power supply line to the tiles 104a-d.

Aligning infrared beams 114 from the IR emitters 118 to the IR detectors 106a-d at the LED display 102 may be achieved by ensuring the IR emitting LEDs 118 are pre-aligned on the printed circuit board so that the dimensional relationship between individual IR emitters 118 in the matrix of IR emitters is fixed within a predetermined tolerance on the PCB. When positioning the PCB with IR emitters 118 in the optics system, the IR emitter matrix pattern projected onto the LED display 102 can be known. By using projector functions, such as focus, zoom, pan, tilt, and horizontal and vertical shifting, the size and position the matrix of IR emitter beams 114 can be manipulated to align with the matrix of IR detectors 106a-d of the tiles 104a-d. These functions may be motorized and may be automated. For example, a system can include an infrared camera and a visible light camera observing the screen while the LED display 102 is displaying a first alignment calibration image and the IR emitters 118 are outputting a second alignment image. In other examples, a single camera is used to capture infrared light and visible light. Alignment calibration algorithms, such as iterative algorithms and closed-loop algorithms, can be used to align images. Providing infrared beams of different wavelengths to neighboring tiles with IR detectors can improve signal-to-noise ratio margins by increasing the space between detectors with the same sensing spectrum. For example, the tiles 104a-d can be positioned such that no adjacent tile has an IR detector with the same sensing spectrum by using two IR detectors with a different IR sensing spectrum. The margin of space between tiles with the same IR sensing spectrum can be further increased by using four different wavelengths (e.g., 830 nm, 850 nm, 870 nm, and 950 nm) in the NIR spectrum, which may be selected such that no adjacent or diagonally adjacent tiles have an IR detector with the same sensing spectrum over the LED display area.

Figure 2:
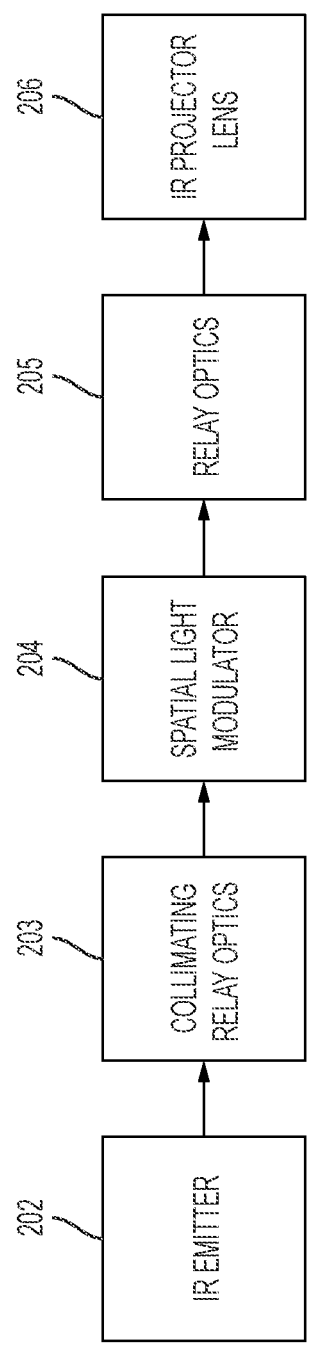
FIG. 2 is a block diagram of an infrared (IR) emitter system according to one example of the present disclosure.

FIG. 2 is a block diagram of an IR emitter system according to another example. The system can modulate an IR beam of light and includes an IR light source that is an IR emitter 202, which is a continuous IR light source (i.e., the light source does not switch to modulate light). The IR light from the IR emitter 202 can be directed through collimating relay optics 203 onto a Spatial Light Modulator (SLM) 204, such as a Digital Mirror Device (DMD) or an LCOS device. The SLM 204 can modulate the IR light with digital data that is image data formatted to control the image pixel LEDs on a display tile that receives the digital data via an IR detector associated with the tile. The SLM 204 can be a 4k or 2k DMD or a DMD with a lower resolution. The modulated IR light can be provided to relay optics 205 and then to an IR projector lens 206 for output toward the LED display, or at least toward a proper tile of the LED display. By having an image projection system project an IR image onto the LED display that has multiple tiles, image data for the tile LEDs can be communicated to each tile via a corresponding pixel or group of pixels of IR imaged light. An SLM 204 with a high switching capability that is several hundred kHz or approaching one 1 MHz or more can be used as described above while maintaining a tile count that is not excessive for a cinema-sized LED display.

Figure 3:
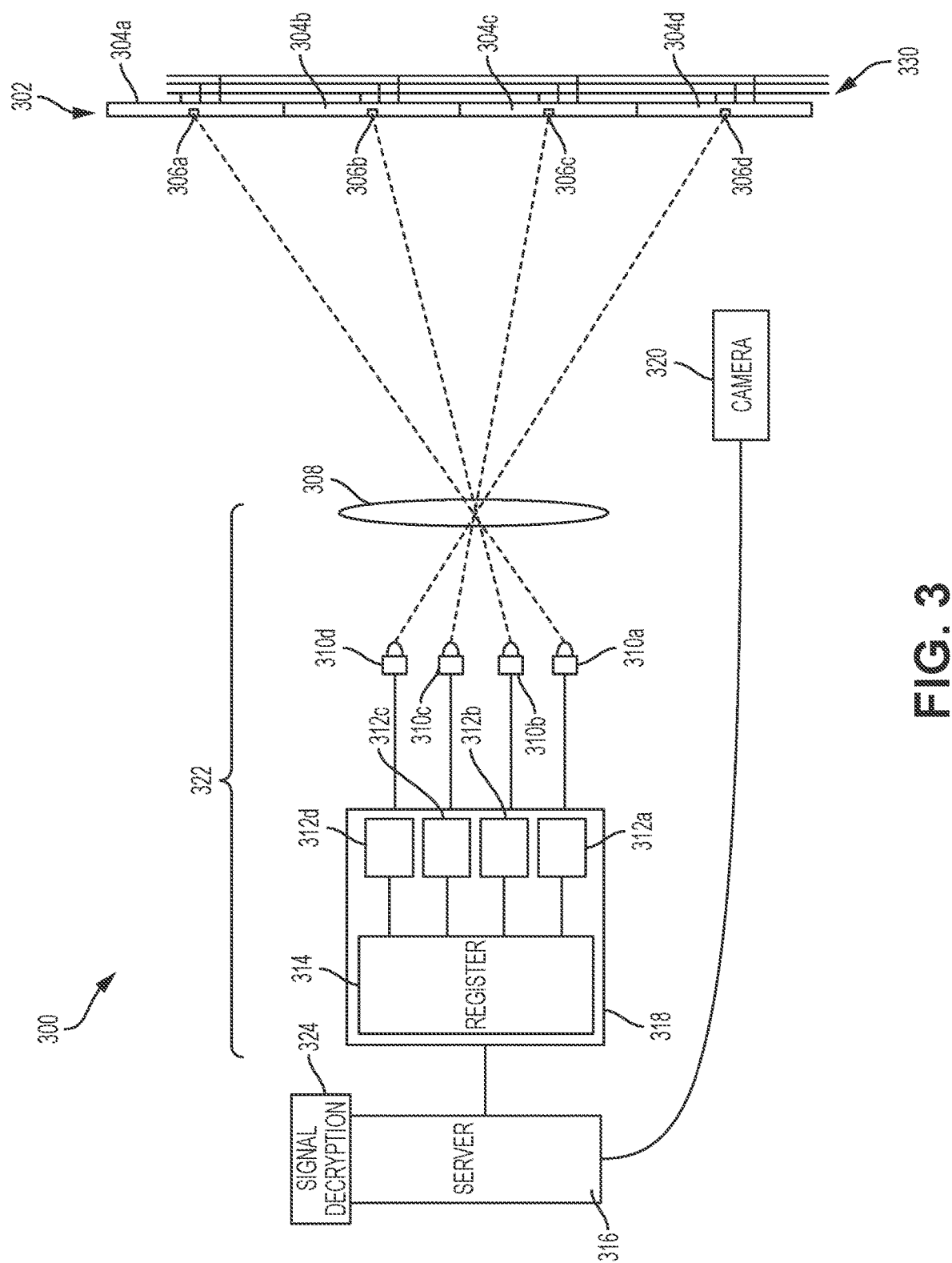
FIG. 3 schematically depicts a wireless content delivery system for an LED display according to one example of the present disclosure.

FIG. 3 schematically depicts a wireless content delivery system 300 for LED display according to one example. An LED display 302 includes IR detectors 306a-d that are IR photodiodes on tiles (also referred to as panels) 304a-d that form the LED display 302. A power supply bus 330 can provide power to the LED display 302 by providing power to each of the tiles 304a-d.

The tiles 304a-d forming the display area may be an array of 64×34 LED circuit boards. Each circuit board can have an array of 64×64 light emitting pixels. This display configuration can provide a resolution of 4096×2176 light emitting pixels. Each light emitting pixel may be a tri-color LED containing three primary light emitting diodes that may each be controlled by a controller, for example a pulse width modulation controller with a bit depth of 16 bits. The image data can be displayed at a rate of twenty-four times per second to provide a twenty-four frames per second (fps) image update rate on the display. A minimum bandwidth to each tile can be 4.72 Mbps (i.e., 64×64×3×16×24). Each tile may have one or more of the IR photodiodes positioned at or near the middle of the tile. Each IR photodiode can receive 4.7 Mbps of data, for example by on/off signaling.

In another example involving stereoscopic 3D, the LED display 302 may have a resolution of 2×2048×1088. The display may be configured as an array of 32×17 tiles or circuit boards. Each tile may have 64×64 light emitting pixels per eye so for an observer's left eye and right eye the circuit board may have 2×64×64 light emitting pixels. Each light emitting pixel may be a tri-color light emitter containing the three primary colors (i.e., red, green, and blue), each color having a bit depth of 16 bits, (i.e., each pixel is represented by 3×16, or 48 bits). A memory on the tile may store image data to be displayed by the tile and the memory may have the size of 2×64×64×3×16 bits, or 393 kbit (i.e., [number of eye views]×[number of pixels on the circuit board horizontally]×[number of pixels on the circuit board vertically]×[number of color channels]×[number of bits used to modulate each color]). The memory may be read repeatedly by a circuit on the tile and the contents of the memory may be used by the circuit to display an image on the tile using techniques such as multiplexing and binary-coded pulse-width modulation (PWM). An example of the multiplexer/PWM refresh rate is a rate between 1000 and 3000 refresh cycles per second, but other refresh rates may be used. The memory may be a dual-port memory capable of having new data written to it concurrently with the electronic circuit reading from it during refresh cycles. Alternatively, the memory may include a first image buffer of 393 kbit and a second image buffer of 393 kbit. The electronic circuit may be able to switch between reading from the first image buffer and from the second image buffer, as directed by an image synchronization signal.

A shift register may receive serial digital data from an IR detector and output the data in a parallel format to the first image buffer when the image synchronization signal directs the electronic circuit to read from the second image buffer, and output the data in a parallel format to the second image buffer when the synchronization signal directs the electronic circuit to read from the first image buffer. A data synchronization signal may clock the received data from the IR detector into the shift register. The data in the shift register may be clocked into the first image buffer or the second image buffer with a clocking signal that is formed by dividing the data synchronization signal by the length of the shift register. The data synchronization signal may be received from a data synchronization infrared sensor. The image synchronization signal may be received from an image synchronization infrared sensor. The infrared sensor, the data synchronization infrared sensor, and the image synchronization infrared sensor may each be sensitive to different wavelengths of infrared light. Alternatively, the image synchronization signal may be derived from the data synchronization signal or from the data received from the infrared sensor. The image synchronization signal may direct a buffer change at an image frame rate at which the display updates the displayed image. An example of the image frame rate is 24 frames per second. The data rate that is received at the infrared sensor may be 24×384, or 9 Mbit/s.

The system in FIG. 3 also includes an infrared projector 322 that includes IR emitters 310a-d positioned in a matrix array located in an image plane of an imaging system that can include a lens 308 for focusing an image of the matrix array onto the LED display 302 so that each IR emitter may illuminate one IR detector and not the other IR detectors. The IR emitters 310a-d can be communicatively coupled to an image memory architecture 318 for providing data to be wirelessly transmitted via the IR emitters 310a-d. The matrix of IR emitters 310a-d may include 64×34 IR emitting diodes placed in the image plane of a focusing lens 308. Each diode can emit data with a bandwidth of at least 4.5 Mbps.

The "projector" can be enclosed in a FIPS 2 secured enclosure and project an infrared image onto the LED display 302 in which the infrared image can be aligned with the array of 64×34 IR detectors on the tiles.

The image memory architecture 318 can include image buffers 312a-d that store the relevant sections of the image data. The image buffers 312a-d may be A/B buffers such that one buffer can be filled up with the relevant section of the next frame while the other is outputting data for the current frame to the IR emitters. A parallel-to-serial clock-out register 314 may also be included. The buffers 312a-d may be fed from a larger buffer storing a full 4K image and all can be served by a server 316 that stores image content in encrypted form. A signal decryption module 324 can decrypt the image content just before the image content is provided to the image memory architecture 318. The server 316 may be an integrated media block (IMB) that can have an encrypted link to the "projector" or itself be enclosed in a secure projector enclosure. For example, the "projector" or transmission system can be contained within an intruder-protected enclosure from which it can emit IR beams or IR signals.

The "projector" may be located in a place where it can easily be serviced or replaced. Further, two "projectors" may operate in tandem for added reliability. Redundant IR transmission systems can operate in synchronization such that IR detectors on the display are illuminated by IR signals from both transmission systems, which may improve reliability. In addition, the "projector" may be positioned (for example, high above the floor) such that at least some of the infrared beams are difficult to access from the public area of the theater.

The system may detect if an object or person is introduced between the "projector" (i.e., transmission system) and the LED display 302 that negatively impacts wireless transmission. For example, the person or object may be illuminated by any of the IR beams emitted by the IR emitters and a camera 320 can be located proximate to the "projector" to detect the presence of the person or the object. The system can disable transmission of image data in at least one of the beams when an object or person is detected.

Figure 4:
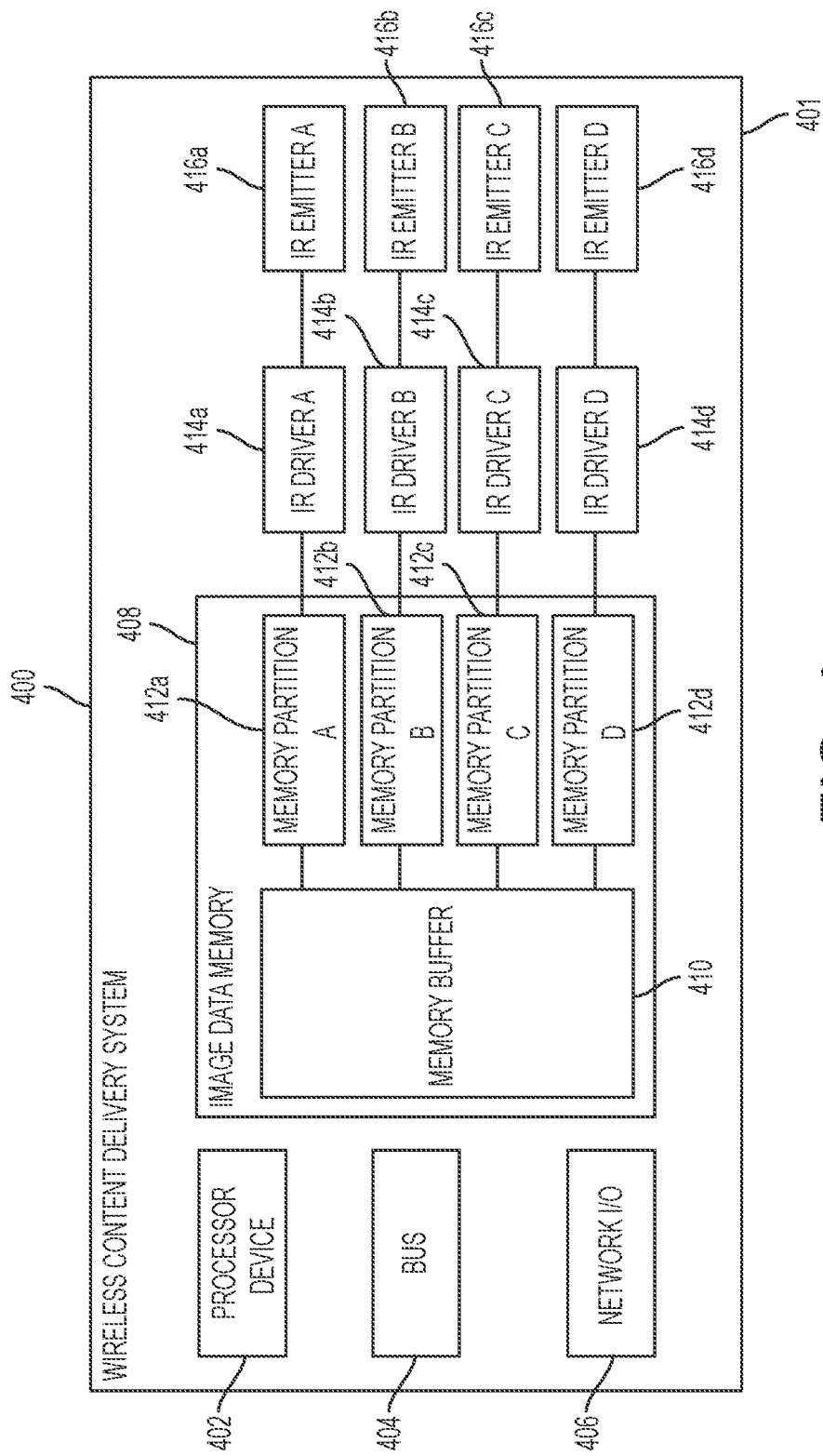
FIG. 4 is a block diagram of a wireless image data content delivery system according to one example of the present disclosure.

FIG. 4 is a block diagram of a wireless content delivery system 400 according to one example. The wireless content delivery system 400, which may be an example of the "projector" of FIG. 3, can be in a secure enclosure 401 that is not accessible by unauthorized individuals.

The wireless content delivery system 400 includes one or more processor devices 402, such as a Field-Programmable Gate Array ("FPGA"), an application-specific integrated circuit ("ASIC"), or a microprocessor, etc. The processor device 402 can execute instructions for managing content wirelessly transmitted to an LED display. The processor device 402 and other components can communicate via a bus 404, and with external devices via a network input/output port 406.

Also included in the wireless content delivery system 400 is an image data memory 408 that includes a memory buffer 410 for storing content to be delivered wirelessly to the LED display. The memory buffer 410 can provide content to memory partitions 412a-d, which may be buffers designated for separate tiles on the LED display. The memory partitions 412a-d can supply image data content to separate IR drivers 414a-d, which can provide IR signals with the image data content to associated IR emitters 416a-d for wirelessly transmitting the signal.

The IR emitters 416a-d can be mounted on a printed circuit board (PCB) in a matrix. The PCB may be connected to a computer system bus, for example a PCI Express External Cable, via the network input/output port, and uncompressed image data may be transmitted over the PCI Express External Cable from a computer to the PCB. The computer may receive compressed image data, for example JPEG 2000 compressed images, from an image storage unit via a connection such as an Ethernet connection.

In one example, the wireless content delivery system 400 can include a matrix of 32×17 IR emitters. Each IR emitter can output a beam directed at the IR detector on one display tile such that the IR beam may not be detected by other IR emitters on other tiles. The IR emitters 416a-d and IR emitter drivers 414a-d may be mounted on a transmitter printed circuit board that is connected to the PCI Express system bus of a computer by PCI Express External cabling. The transmitter printed circuit board may include a data synchronization signal generator for generating a data synchronization signal that may be broadcast to all data synchronization IR detectors on the display tiles. The transmitter printed circuit board may also include a concurrent first-in first-out memory buffer to convert data transmission clock speed between the rate of the data synchronization signal and the rate of the computer system bus. The first-in first-out type memory buffer may be a circular buffer and the transmitter printed circuit board may further include control circuits for the first-in first-out type memory buffer designed so that a computer software code running on the computer can direct the first-in first-out type memory buffer to be filled with data from the computer bus and to read them out to an IR emitter, where the light of the IR emitter may be received by the IR detector. The aggregated net data rate of the transmitted signal for a 24 fps stereoscopic 3D display with three 16-bit color channels for 32×17 display tiles, each display tile having a matrix of 64×64 light emitting pixels and excluding any signaling protocol overhead may be $64 \times 64 \times 24 \times 2 \times 3 \times 16 \times 32 \times 17 = 5.13$ Gbit/s. The PCI Express External cabling may have a maximum data rate of 15.8 Gbit/s.

In another configuration, the LED display can have a resolution of 2×4096×2160 pixels divided into 64×34 tiles, and four IR transmission systems or units of similar characteristics can wirelessly transmit data to the IR detectors. Each of the four transmission units may transmit to one quadrant of the display, each of which may be a lower resolution display but together form a high resolution display. E.g., each quadrant may be a 2K display configuration that together form a 4K display configuration. The transmission units can be communicatively coupled to a common digital image storage system that can provide a high resolution image (e.g., a 4K resolution image), to each of the transmission units. A computing device in each transmission unit can calculate a portion of the high-resolution image to be displayed by one of the lower resolution displays and transmit this via a computer system bus to a set of IR emitters. The high-resolution image transmitted from the image storage to the IR emitter systems may be compressed, for example using the JPEG2000 compression algorithm.

In alternate configurations, the computer can also include the processor device 402, the bus 404, and the I/O 406 of FIG. 4, or the transmitter PCB can decompress image data received from an image storage unit.

Figure 5:
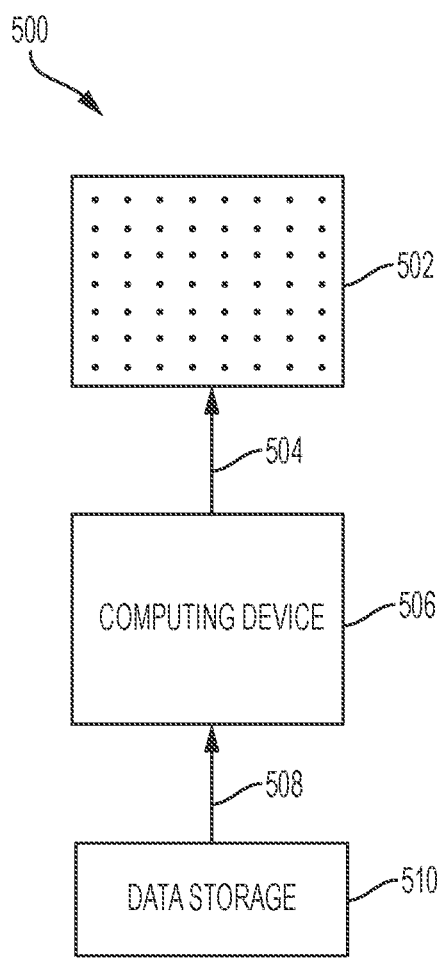
FIG. 5 is a block diagram of an example of an emitter system according to one example of the present disclosure.

FIG. 5 is a block diagram of an example of an emitter system 500 according to some aspects. The system 500 can include a matrix of 32×17 IR emitters mounted on a transmitter PCB 502 that can be focused onto the display by an imaging system. The PCB may be connected to a computer system bus (represented by arrow 504), for example, a PCI Express External Cable, and uncompressed image data may be transmitted over the PCI Express External Cable from a computing device 506 to the PCB. The computing device 506 may receive compressed image data, for example JPEG 2000 compressed images, from an image storage unit 510 via a communication connection, such as an Ethernet connection (represented by arrow 508). The configuration depicted in FIG. 5 may be enclosed in a physically secured enclosure.

Figure 6:
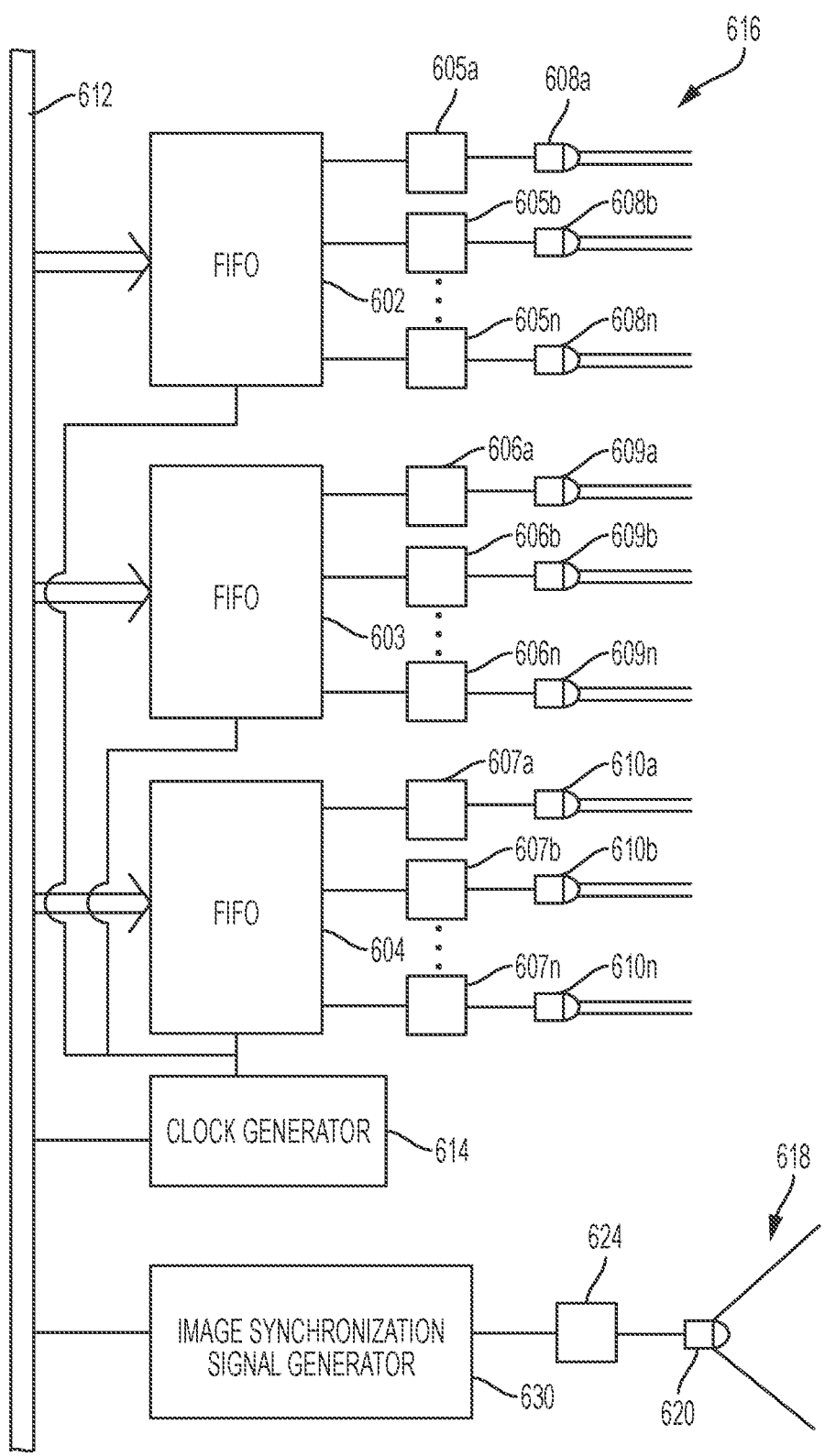
FIG. 6 schematically depicts a system in which each output bit from a first-in-first-out (FIFO) memory buffer is connected to a separate IR LED driver and emitter pair according to one example of the present disclosure.

FIG. 6 schematically depicts more details of an implementation of FIG. 4 in which each output bit from first-in-first-out (FIFO) memory buffers 602-604 is connected to a separate IR LED driver 605a-n, 606a-n, 607a-n and emitter pair 608a-n, 609a-n, 610a-n. The light emitted from each IR emitter 608a-n, 609a-n, 610a-n can be a narrow beam (represented by lines 616) that is directed to the corresponding IR detector on separate LED display tiles to communicate the image data to the corresponding LED tile. The FIFO memory may receive image data from a processor-controlled bus 612 in which the image data is clocked into the memory at a first frequency. A clock generator 614 can be used to generate an IR transmission data clock signal that controls the timing of the FIFO memory output data to the IR LED drivers 605a-n, 606a-n, 607a-n. The IR transmission data clock signal can allow the LED tiles to essentially receive the stream of image data as a synchronized bit sequence for each of the LED tiles. The LED tiles may derive a clock signal from the received IR transmitted image data sequence of bits. Alternatively, the IR transmission data clock signal may be transmitted to all LED tiles, for example by a signal wire, or wirelessly, such as by a broadcasting IR clock emitter 620 that illuminates the corresponding IR detector on the LED display tiles. An image synchronization signal generator 630 may generate and transmit to the LED tiles, via one IR driver 624 and emitter 620 pair on the transmitter PCB, a broad beam (represented by lines 618) that represents an image synchronization signal when data for a new image is to be displayed. The image synchronization signal generator may be controlled by software in the processor via the system bus in FIG. 4. Alternatively, a computer external to the transmitting PCB, but connected to the transmitting PCB via the computer system bus, such as a PCI express bus or a PCI express External Cable bus, can generate the image synchronization signal.

Figure 7:
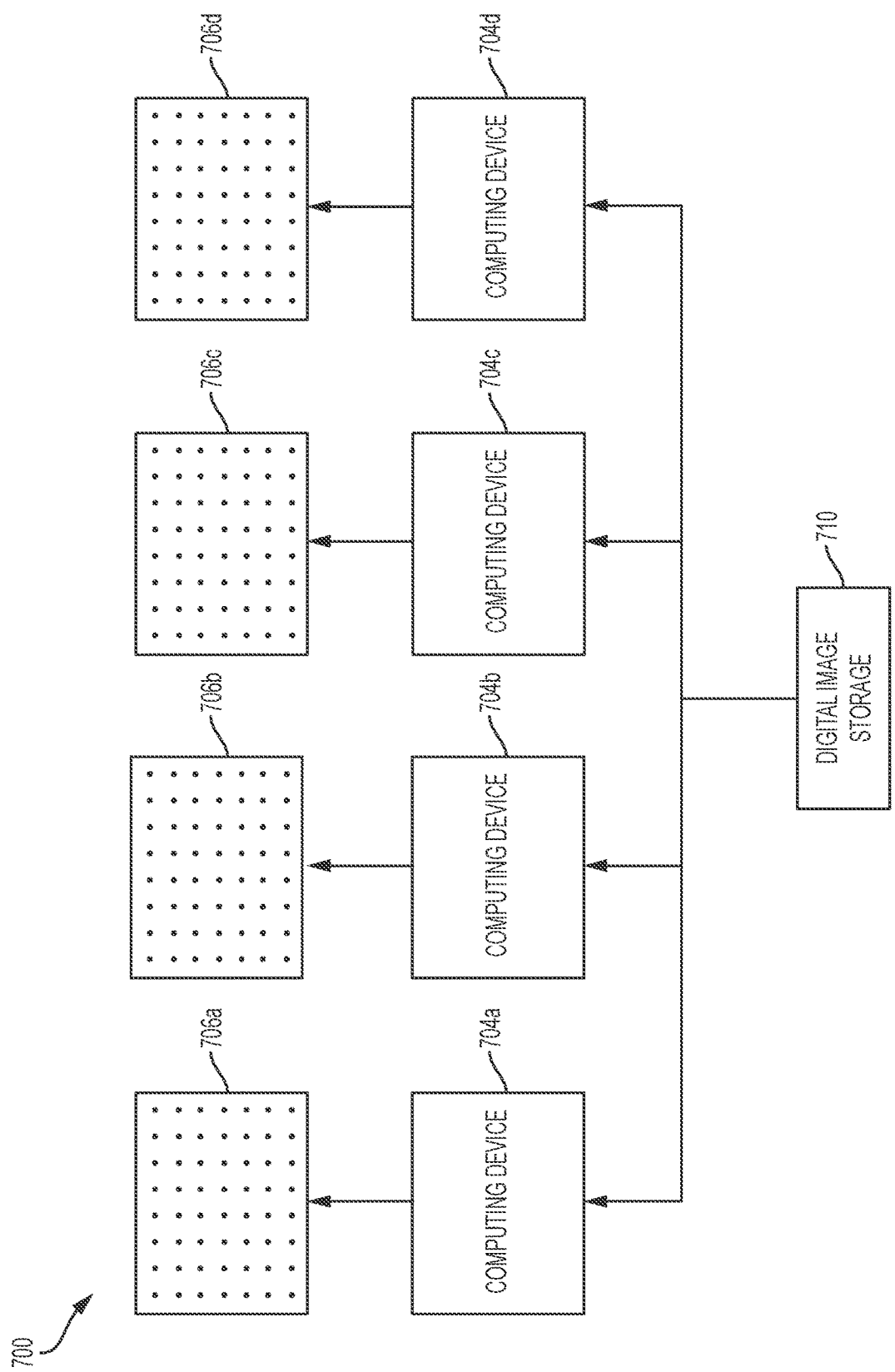
FIG. 7 depicts an example via block diagram of a high-resolution stereoscopic display transmission system with four IR transmitting and emitter systems according to one example of the present disclosure.

A high-resolution stereoscopic display may include a number of lower resolution displays mounted side-by-side. For example, a 4K display may include four 2K displays. FIG. 7 depicts an example via block diagram of a high-resolution stereoscopic display transmission system 700 with four IR transmitting/emitter systems 706*a-d*, one for each of the four lower resolution displays. The systems 706*a-d* may receive image data from a common digital image storage system 710 via separate computing devices 704*a-d*. The storage system 710 can provide the same high resolution image, for example a 4K resolution image, to one of four computing devices 704*a-d* that outputs modified image data to the IR transmitter/emitters 706*a-d*. The computing devices 704*a-d* can decompress image content (e.g., via a JPEG2000 compression algorithm) as needed and can determine the portion of the high-resolution image that is to be displayed on each of the lower-resolution displays. Each of the interfaces between the computer and the IR transmitter PCB can be configured as described in FIGS. 4 and 6. The system in FIG. 7 can also be configured such that one computer performs the function of the four computing devices 704*a-c* depicted.

Figure 8:
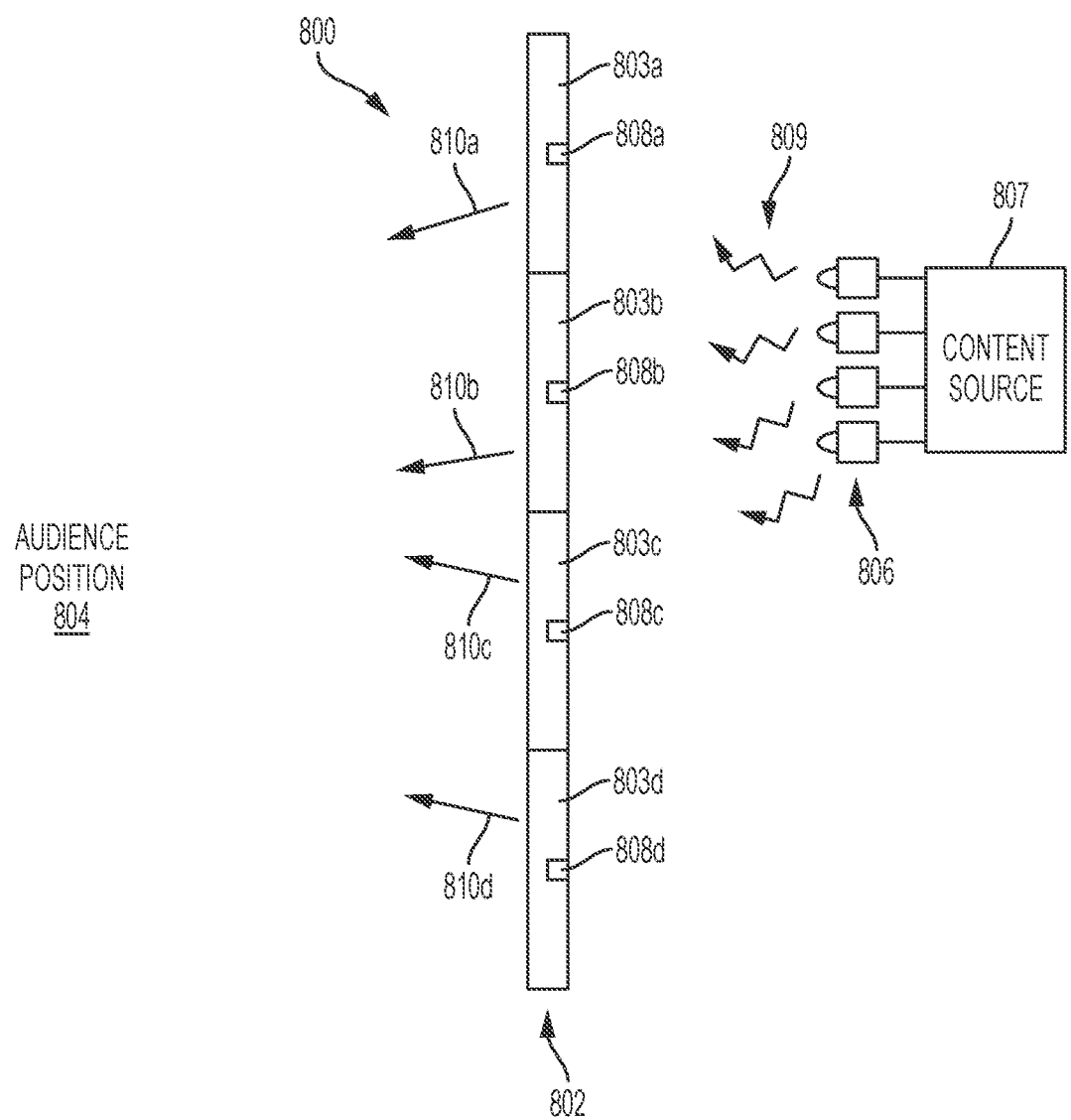
FIG. 8 is a schematic diagram of a wireless content delivery system implementation according to another example of the present disclosure.

FIG. 8 is a schematic diagram of a wireless content delivery system 800 implementation according to another example. In this example, the LED display 802 with tiles 803*a-d* is positioned between an audience position 804 and IR emitters 806 coupled to a content source 807 for content to be displayed by the LED display 802. The IR emitters 806 can wirelessly deliver content (represented by arrows 809) to the LED display 802. The tiles can include IR detectors 808*a-d* on the opposite side of the LED display 802 from the audience position 804 for wirelessly receiving the content to be displayed. The tiles 803*a-d* can cause LEDs to respectively display light (represented by arrows 810*a-d*) toward the audience position 804 based on the content wirelessly received.

Figure 9:
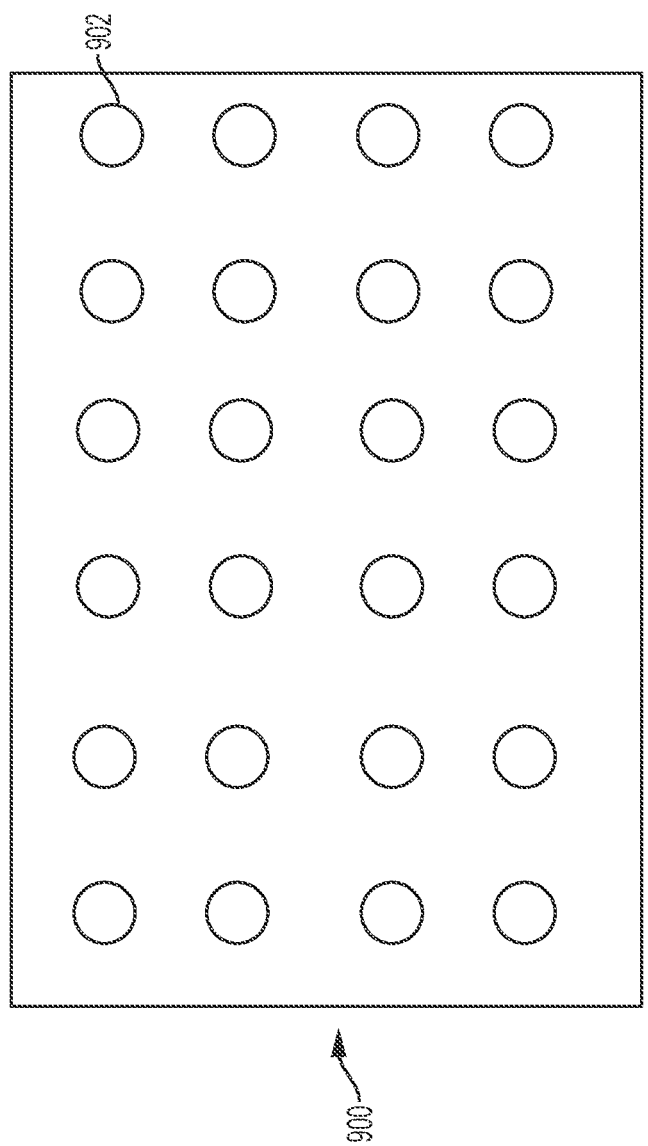
FIG. 9 shows a front view of a laser array with laser diodes that can emit IR beams toward IR detectors on an LED display according to one example of the present disclosure.

Alternatively, IR signals can be wirelessly transmitted by IR emitters that are an array of angle adjustable LED laser diodes. FIG. 9 shows a front view of a laser array 900 with laser diodes 902 that can emit IR beams toward IR detectors on an LED display. The laser array 900 may render use of focusing optics unnecessary. In other examples, the IR signal can be distributed in a IR transparent medium, such as an optical fibre, couplers, or light pipers, positioned behind the LED display by IR emitters located near, or directed towards, the back of the tiles.

A tile may include redundant circuitry, including emitters, to avoid a degraded viewing experience. A failure in the circuits (e.g., address decoders, shift registers, LED drivers, etc.) on an LED circuit board or connections to it (power supply, signal) can affect all LEDs on the tile and render the image displayed by that tile unwatchable. Wirelessly delivering content to LED tiles can enable adding redundant circuitry for each display tile without significant cost to increase reliability.

Figure 10:
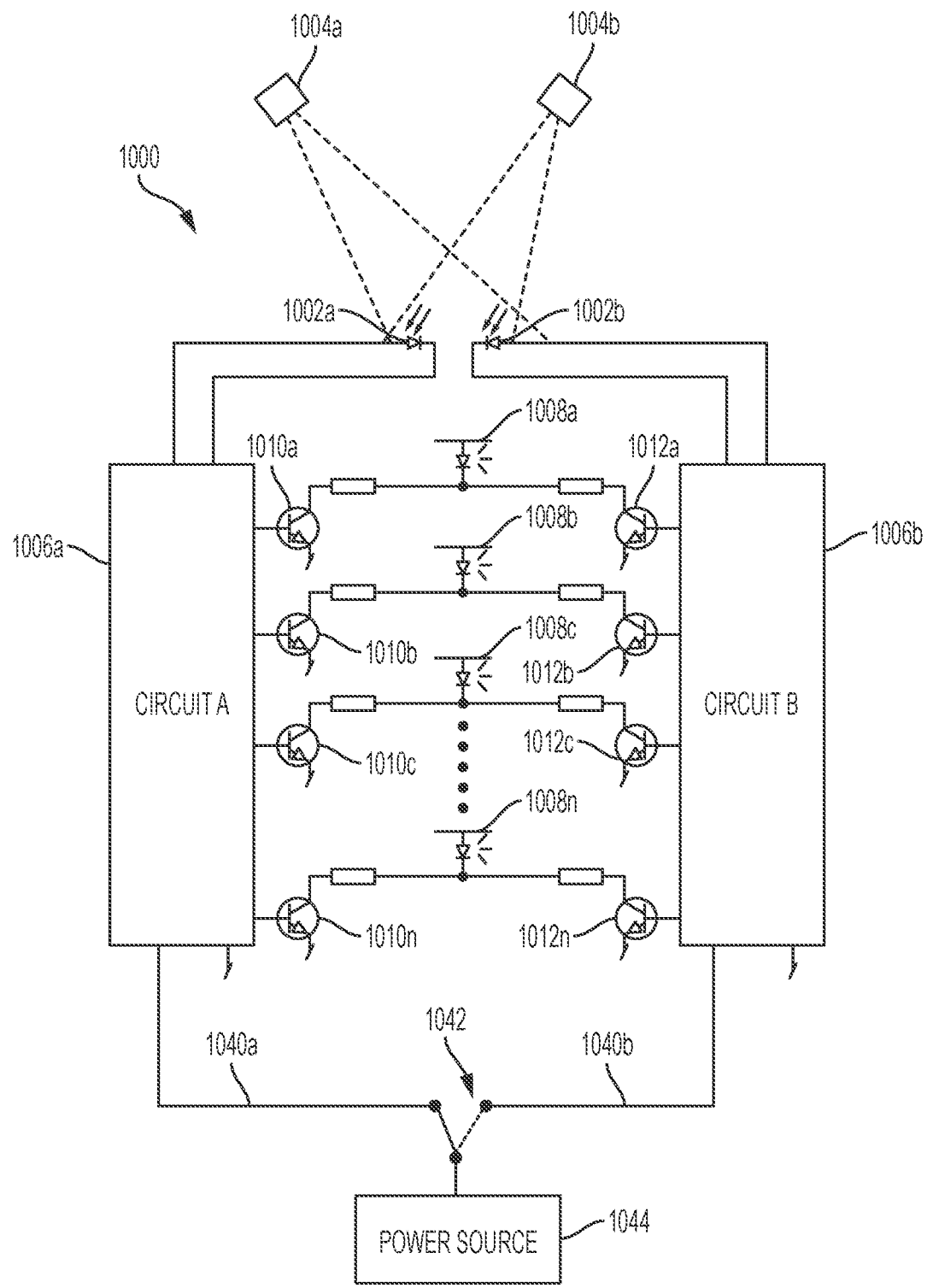
FIG. 10 schematically depicts a circuit board for an LED tile that includes redundant circuitry according to one example of the percent disclosure.

FIG. 10 schematically depicts a circuit board for an LED tile that includes redundant circuitry 1000 according to one example. Each of the redundant circuitry 1000 can be coupled to physically separate power supply paths 1040*a-b* and physically separate signal paths.

Each redundant circuitry 1000 includes an IR detector 1002*a*, 1002*b* for wirelessly receiving wireless signals from a separate IR emitter 1004*a*, 1004*b*. Each redundant circuitry 1000 also includes processing circuitry (e.g., circuit A 1006*a* and circuit B 1006*b*), and LED drivers for driving LEDs 1008*a-n*. For example, circuit A 1006*a* can be associated with LED drivers 1010*a-n* and circuit B 1006*b* can be associated with LED drivers 1012*a-n* Each of circuit A 1006*a* and circuit B 1006*b* can include address decoders, shift registers, and other circuitry.

The LED drivers 1010*a-n*, 1012*a-n* of the redundant circuitry 1000 may be tristate LED drivers that can revert to a high impedance state if there is no power to the circuit (such as open collector drivers for common anode LEDs) to allow both circuits to be connected simultaneously to all LEDs 1008*a-n* on a tile. In some examples, the LED drivers 1010*a-n*, 1012*a-n* can change between two states where one is high impedance and the other is a fixed electrical potential, essentially identical for the first and second circuits. If both circuits are—accidentally or by purpose—switched on at the same time, the driver outputs can be configured such that no damage to the display tile circuit components can occur.

The active circuit at any one point in time can be controlled by powering up the circuit with the select switch 1042 to the power source 1044. One of the circuits can be used for normal operation, and the power supply line for that circuit can be active in normal operation. But if a circuit, or the signal or power supply to a circuit, fails, power can be switched to the backup power supply (not shown), and the backup circuit can take over to supply data and control the LEDs. Additionally, the backup signal path may be an infrared line-of-sight data-transmission link to one or more tiles.

In another example, low-bandwidth data is transmitted to tiles using cable connections instead of infrared light. The cable connections may be galvanic or optical.

In some examples, a high-bandwidth networked connection can be used between panels with self-managing and self-identification properties and sufficient bandwidth in connections to offer alternative paths for redundancy. Self-identifying panels or tiles can communicate to adjacent panels on any edge—vertically or laterally. When a panel powers on, or upon establishing communication with an adjacent panel, the panel can identify itself to neighboring panels. Replies received by the panel can include the identity (represented by a unique identifier) of each neighbor panel such that the initiating panel can form a matrix network with adjacent panels. The location of panels can be mapped by the surface on which communications from a respective panel appears. A message for a specific panel can be passed from panel to panel by many different paths. A sufficiently advanced query process can teach each panel the position and unique identifier of all the panels in the display such that message routing and communication can originate at any point in the array and terminate at any point in the array. The path may be direct or indirect, following an available communication path. The communication path can be dynamic—e.g., the path changing for each message or from time to time as a pathway is available. These processes can be self-organizing and self-managing with appropriate algorithms.

Figure 11:
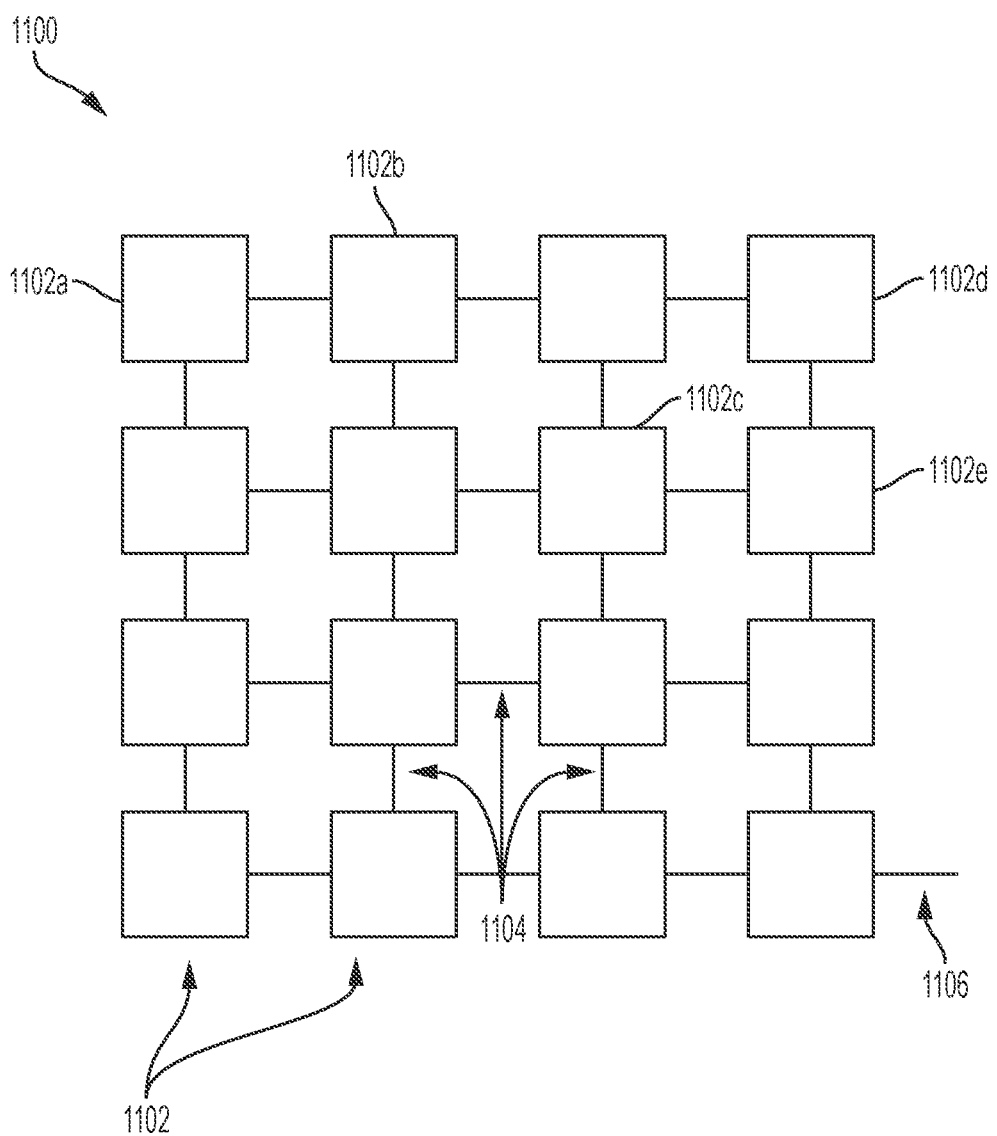
FIG. 11 depicts an a display system with communicatively coupled tiles according to one example of the present disclosure.

FIG. 11 depicts an example of a display system 1100 with communicatively coupled tiles 1102. The display system 1100 includes multiple tiles 1102 or panels placed spatially to form a large image area. Between each adjacent tile is a communication link 1104 that allows image data information to be exchanged between tiles 1102. There can be one data link connected to a tile that allows image data information to feed the display system with all of the tiles which is the display data input 1106.

A system as in FIG. 11 can result in a display system 1100 that is easier to set up and maintain. For example, panels can determine their own position in a matrix of display tiles 1102 by the communication port for the link 1104 between tiles that have a physical connection. If only two specific ports are utilized, the tile can know that it is positioned at a corner as a corner tile, such as corner tile 1102*a*, and knowing which two ports of the four ports on the tile are connected can result in the tile knowing which corner of the display at which the tile is positioned (e.g., top left 1102*a*, top right, bottom left, or bottom right). A tile "knowing" its location can include a processor and memory in the tile determining a position of the associated tile in relation to other tiles of the LED display system. If there are three connections being utilized on the tile, the tile can be at an edge position between corners and is an edge tile 1102*b*, and knowing which three ports of the four ports that are being utilized, the tile can know which edge of the display at which the tile is positioned (e.g., top edge tile 1102*b*, bottom edge, left edge, or right edge). If four ports are utilized, the tile can know that it is in the interior portion of the matrix of tiles and is an interior tile 1102*c*. Determining the position of the tile along an edge or in the interior area can be determined by passing a token packet of positional information in a predetermined sequence and updating the token packet with the positional information when passed from one tile to the next.

For example, a token packet can start from a predetermined corner tile, which can be the top left corner tile 1102*a*. The token packet can have an ID, such as (1,1), that is representative of the top left tile position where the first number represents the first row position and the second number represents the first column position. The top left corner tile can update the ID position by incrementing the column number from 1 to 2 so that the ID number becomes (1,2) and the top left corner tile can pass the ID packet to the next tile on the right along the in the top row. The top edge tile 1102*b* can receive and store its ID number. The tile can be aware by the ID number that it received and the port through which it received the ID packet, or by the configuration its communication ports that are connected, that it is in the top row. Based on this information, the tile in this situation knows to increment the column number in the ID packet from 2 to 3 and pass the token to its other side port to the next tile. The tile on its right can receive the token with an ID packet number (1,3) and store this ID number, increment the column number from 3 to 4, and pass the token with the updated ID packet number to the next tile on its right via its other side port. This process can continue for each top edge tile until all top edge tiles have received the token with the ID packet positional information.

When the top right corner tile 1102*d* is reached, its ID number can be (1,Y), where Y is the column number of the top right corner tile. The top right corner tile can store its ID position information received, update the token packet positional information to (2,Y), and pass the updated token to the tile positioned below it in the LED display. The right edge tile 1102*e*, by its communication port configuration or the ID packet information received from its top communication port, can pass the token to the interior column tile 1102*c* beside it and decrement the column number so that the token ID packet position information becomes (2, Y−1). The adjacent tile knows it has four ports connected and what it has received through its side communication port to decrement the column number in the token ID packet so that the token ID becomes (2, Y−2). This process of passing the token to the next tile and incrementing or decrementing the corresponding position number in the token ID can continue as the token passes along each row and column. Passing the token to each tile in the matrix of tiles in the display can provide each tile with a unique identity in which the tile position relative to the other tile positions is known. The tile positional information can be communicated back to a processor and used to partition the image data to correspond with the total number of tiles and the tile position such that the tile images can be seen as one displayed image that is the intended displayed image. The sequence of identifying the tile positions can be determined by other sequencing patterns, such as identifying rows in columns first or columns in rows first such as described above.

Image data can be included in packets of information specific to a tile and labeled with the tile's ID number. Since each tile is aware of its position relative to other tile positions, a tile can pass on the image packet of information that it receives through the most appropriate port of its ports that are connected to provide the packet of image data to the appropriate tile. If a port goes down or is busy, the tile can pass the image packet through an alternate second best port. If the tile receives an image packet of information with its own ID, the tile can use the image data from the image packet to display the image data provided on the tile. The configuration described can allow a display formed by multiple tiles to configure itself, and a processor for the display system can partition the image data automatically according to the number of tiles and the position of the tiles. Tiles used in the display can be the same design, allowing management of tile replacement to be simplified. Tile replacement can be performed by replacing a defective tile and performing the tile ID algorithm as described above so that new tiles that are added can establish their ID for their position in the matrix of tiles.

Alternatively, a display with multiple tiles can be reconfigured in accordance with the size of the space available for the display. For example, image displays of the same tiles can be configured for different size cinema auditoriums and automatically configure itself. The image data can be automatically partitioned for the number of tiles in the display system. Additionally, the tiles for the display can be arranged for any display aspect ratio (i.e., the ratio of display width to height) needed for a particular application.

Figure 12:
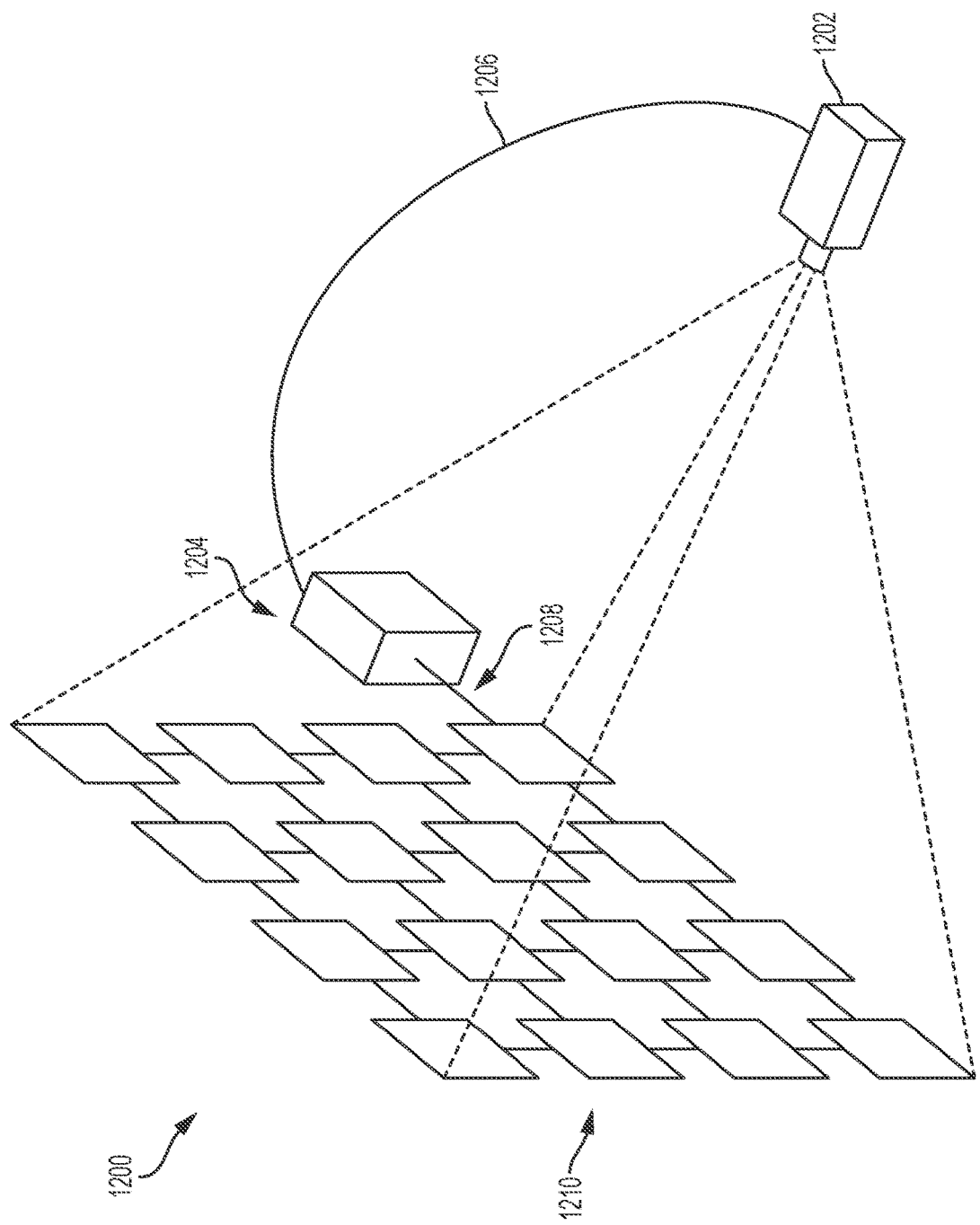
FIG. 12 schematically illustrates an LED display with a calibration configuration according to one example of the present disclosure.

Color balance and brightness of tiles can be calibrated so that the display has uniform color balance and brightness over the tiles of the display. One example to achieve display image uniformity can be to use an image sensor, such as a camera positioned to capture an image of the displayed image where the displayed image can be a test image. The image captured by the camera can be analyzed and compared with a reference image or a threshold to determine the color or brightness compensation required at each tile. The compensation information can be communicated to the tile via the distributed display's communication network. Other image quality related parameters besides color and brightness can be compensated in the same manner. FIG. 12 schematically illustrates an LED display with a calibration configuration 1200. A camera 1202 can capture a test image on the display and can communicate via a communication medium 1206 the captured image data to a processor 1204 that analyzes the captured image data and calculates the required compensation that is communicated via a communication medium 1208 to the display that is a matrix of tiles 1210. Each tile that receives the compensation information can store the compensation information locally and can adjust the output of the light emitting components on the tile independent of the image content data. This can also allow the image data to be used without having to use compensation methods that involve modifying the image data to reduce image data processing.

In some aspects, wirelessly transferring data for output by an active display is provided according to one or more of the following examples:

Example 1 is a wireless content delivery system, comprising: a plurality of wireless emitters communicatively coupled to a source of content, each wireless emitter of the plurality of wireless emitters being configured for wirelessly transmitting content for display by a tile of an LED display that is physically separated from the plurality of wireless emitters and that includes wireless signal detectors for receiving the content for display.

Example 2 is the wireless content delivery system of example 1, wherein the plurality of wireless emitters is positionable in a theatre at a position at which a patron-seating area is located between the position and a location of the LED display.

Example 3 is the wireless content delivery system of example 1, wherein the plurality of wireless emitters is positionable in a theatre at a position at which the LED display is located between the position and a location of a patron-seating area.

Example 4 is the wireless content delivery system of any of examples 1 to 3, further comprising: a non-transitory computer-readable memory comprising a plurality of partitions in which to store content for tiles of the LED display, each partition of the plurality of partitions being configured for storing content to be provided to a wireless emitter of the plurality of wireless emitters; and a content server configured to provide the content to the non-transitory computer-readable memory.

Example 5 is the wireless content delivery system of example 4, wherein the non-transitory computer-readable memory comprises a memory buffer configured to store the content from the content server and to provide the content to the plurality of partitions, the wireless content delivery system further comprising: a plurality of wireless transmitter drivers configured to modulate the content onto a wireless carrier for transmission by the plurality of wireless transmitters.

Example 6 is the wireless content delivery system of example 5, wherein the plurality of wireless transmitters is a plurality of infrared signal emitters configured to transmit infrared beams that include the content for display by the LED display, wherein the wireless signal detectors are a plurality of photodetectors configured for detecting the infrared beams.

Example 7 is the wireless content delivery system of example 6, further comprising a lens positionable between the plurality of infrared signal emitters and the photodetectors, the lens being configured to focus each infrared beam from each infrared signal emitter of the plurality of infrared signal emitters toward a particular photodetector of the plurality of photodetectors.

Example 8 is the wireless content delivery system of example 5, wherein the plurality of wireless transmitters is a plurality of lasers formed in an array and configured to transmit laser beams that include the content for display by the LED display.

Example 9 is the wireless content delivery system of any of examples 1 to 8, further comprising the LED display, each tile of the LED display comprising: at least two wireless signal detectors; at least two LED driver circuits that are each configured to control LEDs on the tile according to content from the wireless signal detected by a wireless signal detector of the at least two wireless signal detectors, each LED driver circuit of the at least two LED driver circuits being configured to control the LEDs on the tile when the other LED driver circuit of the at least two LED driver circuits is in an off or malfunctioning state.

Example 10 is the wireless content delivery system of any of examples 1 to 9, further comprising a camera positionable proximate to the plurality of emitters, the camera being configured to detect an obstruction between the plurality of emitters and the wireless signal detectors and output data for controlling at least one emitter of the plurality of emitters.

Example 11 is the wireless content delivery system of any of examples 1 to 10, wherein each emitter of the plurality of emitters is configured for wirelessly transmitting content for display by the tile of the LED display by being configured to transmit a narrow-angle beam directed toward a corresponding wireless signal detector associated with the tile, the narrow-angle beam being configured to carry the content for display by the tile.

Example 12 is a wireless content delivery system, comprising: a tile for an LED display, the tile comprising a plurality of LEDs and a wireless signal detector on the tile or communicatively coupled thereto, the wireless signal detector being configured to detect a wireless signal transmitted by an emitter that is physically separate from the LED display, the wireless signal carrying content for display by the tile for the LED display.

Example 13 is the wireless content delivery system of example 12, wherein the tile is included in a plurality of tiles forming the LED display, the plurality of tiles including a plurality of wireless signal detector such that each tile of the plurality of tiles includes at least one wireless signal detector of the plurality of wireless signal detectors.

Example 14 is the wireless content delivery system of any of examples 12 to 13, wherein the wireless signal detector has a bandwidth in a range of 1 MHZ to 50 MHZ.

Example 15 is a method comprising: separately and wirelessly transmitting, by a plurality of wireless transmitters, signals toward an LED display with tiles having wireless signal detectors, the signals including data for display on the LED display, each wireless transmitter of the plurality of wireless transmitters directing the signals toward a designated wireless signal detector on the LED display; and detecting the wireless signals and converting the wireless signals to electronic signals for controlling light output by the LED display.

Example 16 is a wireless content delivery system, comprising: a light source; and a spatial light modulator communicatively coupled to a source of content, the spatial light modulator being configured for modulating light from the light source based on the content for wirelessly transmitting content for display by a tile of an LED display that is physically separated from the spatial light modulator and that includes wireless signal detectors for receiving the content for display.

Example 17 is a display system comprising: a first tile for displaying a first image; and a second tile for displaying a second image, wherein the first tile is connected to the second tile to communicate data with the second tile, the first tile being configured to display first image data received by the first tile that is intended for the first tile to display and pass second image data intended for a second tile to display to the second tile, the second image data being different than the first image data.

Example 18 is the display system of example 17, wherein the system is a matrix of multiple tiles, each tile being connected to communicate data with each adjacent tile and being configured to display image data corresponding to the intended tile.

Example 19 is the display system of example 18, wherein a number of the multiple tiles used for the display system is selectable based on a size of a theatre auditorium in which the display system is to be positioned.

Example 20 is the display system of example 18, wherein the tiles are configured to create at least two different display aspect ratios for the display system.

Example 21 is the display system of example 18, further comprising an image sensor configured to capture a displayed image of the display system to determine a compensation that is applied to each tile in the display system.

Example 22 is the display system of example 21, where each tile is configured for storing received corresponding compensation information and subsequently applying the corresponding compensation information to modify display light outputted by the tile.

Example 23 is the display system of example 17, further comprising a processor configured for executing an algorithm to cause the first tile and the second tile to determine respective positions of the first tile and the second tile in the display and communicate the respective positions to the processor.

Example 24 is the display system in claim 23, wherein each of the first tile and the second tile is replaceable, the display system being configured to automatically cause a replacing tile to determine the position of the replacing tile in the display system by the algorithm.

Example 25 is the display system of example 23, wherein the processor is further configured for using the positions of the first tile and the second tile to partition image data into the first image data for the first tile and the second image data for the second tile.

The foregoing description of certain embodiments, including illustrated embodiments, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:

1. A wireless content delivery system, comprising:
    a plurality of wireless emitters communicatively coupled to a source of content, each wireless emitter of the plurality of wireless emitters being configured for wirelessly transmitting content for display by a tile of an active display that is physically separated from the plurality of wireless emitters and that includes a plurality of wireless signal detectors for receiving the content for display by detecting beams of wireless signals that include the content from the plurality of wireless emitters, wherein a physical position of at least one wireless emitter among the plurality of wireless emitters is configured to be manipulated to align a beam from the at least one wireless emitter with an associated wireless signal detector among the plurality of wireless signal detectors; and
    an imaging system with an image plane positionable between the plurality of wireless emitters and the plurality of wireless signal detectors, the imaging system being configured to focus each beam from each wireless emitter of the plurality of wireless emitters toward a particular wireless signal detector of the plurality of wireless signal detectors, wherein the plurality of wireless emitters is positionable at the image plane of the imaging system and the plurality of wireless signal detectors is positionable on an active display area of the active display.

2. The wireless content delivery system of claim 1, wherein the plurality of wireless emitters is positionable in a theatre at a position at which a patron-seating area is located between the position and a location of the active display.

3. The wireless content delivery system of claim 1, wherein the plurality of wireless emitters is positionable in a theatre at a position at which the active display is located between the position and a location of a patron-seating area.

4. The wireless content delivery system of claim 1, further comprising:
    a non-transitory computer-readable memory comprising a plurality of partitions in which to store content for tiles of the active display, each partition of the plurality of partitions being configured for storing content to be provided to a wireless emitter of the plurality of wireless emitters; and
    a content server configured to provide the content to the non-transitory computer-readable memory.

5. The wireless content delivery system of claim 4, wherein the non-transitory computer-readable memory comprises a memory buffer configured to store the content from the content server and to provide the content to the plurality of partitions, the wireless content delivery system further comprising:
    a plurality of wireless transmitter drivers configured to modulate the content onto a wireless carrier for transmission by the plurality of wireless emitters.

6. The wireless content delivery system of claim 1, wherein the plurality of wireless emitters is a plurality of infrared signal emitters configured to transmit infrared beams that include the content for display by the active display, wherein the plurality of wireless signal detectors is a plurality of photodetectors configured for detecting the infrared beams.

7. The wireless content delivery system of claim 5, wherein the plurality of wireless emitters is a plurality of lasers formed in an array and configured to transmit laser beams that include the content for display by the LED active display.

8. The wireless content delivery system of claim 1, further comprising the active display, each tile of the active display comprising:
    at least two wireless signal detectors;
    at least two LED driver circuits that are each configured to control LEDs on the tile according to content from the wireless signal detected by a wireless signal detector of the at least two wireless signal detectors, each LED driver circuit of the at least two LED driver circuits being configured to control LEDs on the tile when the other LED driver circuit of the at least two LED driver circuits is in an off or malfunctioning state.

9. The wireless content delivery system of claim 1, further comprising a camera positionable proximate to the plurality of wireless emitters, the camera being configured to detect an obstruction between the plurality of wireless emitters and the wireless signal detectors and output data for controlling at least one emitter of the plurality of wireless emitters.

10. The wireless content delivery system of claim 1, wherein the position of at least one wireless emitter among the plurality of wireless emitters is configured to be manipulated by a projector system performing at least one projector function on the at least one wireless emitter, the at least one projector function being selected from the group consisting of a zoom function, a focus function, a vertical shift function, a horizontal shift function, a pan function, and a tilt function.

11. The wireless content delivery system of claim 1, wherein each wireless emitter of the plurality of wireless emitters is configured to wirelessly transmit a wireless signal that has a different wavelength than another wireless signal wirelessly transmitted by another wireless emitter of the plurality of wireless emitters.

12. The wireless content delivery system of claim 1, wherein the plurality of wireless emitters is configured to be pre-aligned on a printed circuit board such that a dimensional relationship between each wireless emitter of the plurality of wireless emitters is fixed within a predetermined tolerance of the printed circuit board.

13. The wireless content delivery system of claim 1, wherein the imaging system is a focus lens.

14. A wireless content delivery system, comprising:
a first tile for an LED display, the first tile comprising a plurality of LEDs and a wireless signal detector on the first tile or communicatively coupled thereto, the wireless signal detector being configured to detect a wireless signal transmitted by a first emitter that is physically separate from the LED display, the wireless signal carrying content for display by the first tile for the LED display, wherein the wireless signal detector is configured to detect the wireless signal that has a different wavelength than another wireless signal that is transmitted by a second emitter and that is detectable by another wireless signal detector that is on or communicatively coupled to a second tile for the LED display.

15. The wireless content delivery system of claim 14, wherein the wireless signal detector has a bandwidth in a range of 1 MHZ to 50 MHZ.

16. The wireless content delivery system of claim 14, further comprising an image sensor configured to capture a displayed image of the wireless content delivery system to determine a compensation that is applied to each tile in the wireless content delivery system.

17. The wireless content delivery system of claim 14, further comprising the second tile, wherein each of the first tile and the second tile is configured for storing received corresponding compensation information and subsequently applying the corresponding compensation information to modify display light outputted by the first tile and the second tile.

18. The wireless content delivery system of claim 14, further comprising a processor configured for executing an algorithm to cause the first tile and the second tile to determine respective positions of the first tile and the second tile in the LED display and communicate the respective positions to the processor.

19. The wireless content delivery system of claim 18, wherein each of the first tile and the second tile is replaceable, the wireless content delivery system being configured to automatically cause a replacing tile to determine the position of the replacing tile in the LED display by the algorithm.

20. A method comprising:
separately and wirelessly transmitting, by a plurality of wireless transmitters, beams of wireless signals toward an active display with tiles having a plurality of wireless signal detectors, the beams of wireless signals including data for display on the active display, each wireless transmitter of the plurality of wireless transmitters directing the beams of wireless signals toward a designated wireless signal detector on the active display and having a position that is manipulated to align each respective beam with the designated wireless signal detector for the wireless transmitter of the plurality of wireless transmitters;
imaging, by an imaging system positioned between the plurality of wireless transmitters and the plurality of wireless signal detectors, each beam from each wireless transmitter of the plurality of wireless transmitters toward the designated wireless signal detector of the plurality of wireless signal detectors, wherein the plurality of wireless transmitters are positionable at an image plane of the imaging system; and
detecting the beams of wireless signals and converting the beams of wireless signals to electronic signals for controlling light output by the active display.

21. A wireless content delivery system, comprising:
a light source; and
a spatial light modulator communicatively coupled to a source of content, the spatial light modulator being configured for modulating light from the light source based on the content for wirelessly transmitting content for display by a tile of an LED display that is physically separated from the spatial light modulator and that includes wireless signal detectors for receiving the content for display.

22. A theatre comprising:
a display system comprising:
a first active tile for displaying a first image, the first active tile including or being associated with a first wireless signal detector that is configured to detect a first wireless signal that includes content for display by the first active tile and that is transmitted by a first wireless emitter physically disconnected from the display system;
a second active tile for displaying a second image, the second active tile including or being associated with a second wireless signal detector that is configured to detect a second wireless signal that includes content for display by the second active tile, that is transmitted by a second wireless emitter, and that has a different wavelength than the first wireless signal; and
a lens positionable between (1) the first wireless emitter and the second wireless emitter and (2) the first wireless signal detector and the second wireless signal detector, the lens being configured to focus the wireless signal from the first wireless emitter toward the first wireless signal detector and to focus the second wireless signal from the second wireless emitter toward the second wireless signal detector, wherein the first wireless emitter and the second wireless emitter are positionable at an image plane of the lens; and
a projector that includes the first wireless emitter and the second wireless emitter, the projector being positioned in the theatre such that the first wireless signal and the second wireless signal are inaccessible to patrons in a patron-seating area of the theatre,
wherein physical positions of the first wireless emitter and the second wireless emitter are configured to be manipulated to align the first wireless signal with the first wireless signal detector and the second wireless signal with the second wireless signal detector.

23. A wireless content delivery system comprising:

a first projector having a first infrared transmission system;

a second projector having a second infrared transmission system; and a display having a plurality of infrared detectors configured to be illuminated by the first projector and the second projector, wherein the first infrared transmission system and the second infrared transmission system are configured to operate in synchronization with each other and to provide redundancy to each other such that an infrared detector of the plurality of infrared detectors is illuminated by the first infrared transmission system and the second infrared transmission system.

* * * * *